United States Patent
Schemers et al.

(10) Patent No.: US 12,021,821 B2
(45) Date of Patent: **\*Jun. 25, 2024**

(54) METHODS AND APPARATUSES FOR MANAGING DATA INTEGRATION BETWEEN AN EXTERNAL EMAIL RESOURCE AND A GROUP-BASED COMMUNICATION SYSTEM

(71) Applicant: Salesforce, Inc., San Francisco, CA (US)

(72) Inventors: Roland Schemers, Woodside, CA (US); James McPhail, San Francisco, CA (US); Matthew Wahl, San Francisco, CA (US); San Oo, San Francisco, CA (US)

(73) Assignee: Salesforce, Inc., San Francisco, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/509,298

(22) Filed: Oct. 25, 2021

(65) Prior Publication Data

US 2022/0103511 A1 Mar. 31, 2022

Related U.S. Application Data

(63) Continuation of application No. 16/263,799, filed on Jan. 31, 2019, now Pat. No. 11,159,476.

(51) Int. Cl.
*H04L 51/56* (2022.01)
*G06F 16/245* (2019.01)
(Continued)

(52) U.S. Cl.
CPC ............ *H04L 51/56* (2022.05); *G06F 16/245* (2019.01); *G06F 40/205* (2020.01); *G06F 40/30* (2020.01);
(Continued)

(58) Field of Classification Search
CPC ...... G06F 16/245; G06F 40/205; G06F 40/30; H04L 51/063; H04L 51/24; H04L 51/26; H04L 61/307
See application file for complete search history.

(56) References Cited

U.S. PATENT DOCUMENTS

2012/0143798 A1\* 6/2012 Sundelin ............... H04L 51/212
 706/12
2015/0088784 A1\* 3/2015 Dhara ...................... G06N 5/02
 706/11

(Continued)

OTHER PUBLICATIONS

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Dhairya A Patel
*Assistant Examiner* — Eui H Kim
(74) *Attorney, Agent, or Firm* — Holland & Hart LLP

(57) ABSTRACT

Methods, systems, and apparatuses for programmatically managing email data integration between an external email resource associated with a group-based communication system user and a group-based communication system are provided herein.

14 Claims, 10 Drawing Sheets

(51) Int. Cl.
  G06F 40/205    (2020.01)
  G06F 40/30     (2020.01)
  H04L 51/063    (2022.01)
  H04L 51/224    (2022.01)
  H04L 51/226    (2022.01)
  H04L 101/37    (2022.01)
(52) U.S. Cl.
  CPC .......... *H04L 51/063* (2013.01); *H04L 51/224* (2022.05); *H04L 51/226* (2022.05); *H04L 2101/37* (2022.05)

(56) References Cited

U.S. PATENT DOCUMENTS

| | | | |
|---|---|---|---|
| 2015/0278346 A1* | 10/2015 | Aiello | G06F 16/3334 707/798 |
| 2016/0014063 A1* | 1/2016 | Hogeg | H04N 21/6125 709/206 |
| 2016/0261531 A1* | 9/2016 | Bronicki | H04L 51/212 |
| 2017/0063736 A1* | 3/2017 | Herger | H04L 51/42 |
| 2018/0260782 A1* | 9/2018 | Bay | H04L 51/046 |
| 2018/0287982 A1 | 10/2018 | Draeger et al. | |
| 2018/0336280 A1* | 11/2018 | Yin | G06F 16/2455 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

Figure 5F

METHODS AND APPARATUSES FOR MANAGING DATA INTEGRATION BETWEEN AN EXTERNAL EMAIL RESOURCE AND A GROUP-BASED COMMUNICATION SYSTEM

RELATED APPLICATIONS

This patent application is a continuation application claiming priority benefit, with regard to all common subject matter, of U.S. patent application Ser. No. 16/263,799, filed Jan. 31, 2019, now U.S. Pat. No. 11,159,476, issued Oct. 26, 2021, and entitled "METHODS AND APPARATUSES FOR MANAGING DATA INTEGRATION BETWEEN AN EXTERNAL EMAIL RESOURCE AND A GROUP-BASED COMMUNICATION SYSTEM." The above-referenced application is hereby incorporated by reference in its entirety into the present application.

TECHNOLOGICAL FIELD

Embodiments of the invention relate, generally, to programmatically managing data integration between an external email resource and a group-based communication system. Example data integration include integrating external communication objects associated with outgoing and incoming emails, calendar invites, and the like.

BACKGROUND

Various messaging systems may support communication and collaboration among users across an organization. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for an apparatus configured to programmatically manage email data integration between an external email resource associated with a group-based communication system user and a group-based communication system.

In some embodiments of the present disclosure, an apparatus may be provided for programmatically managing email data integration between an external email resource associated with a group-based communication system user and a group-based communication system, the apparatus comprising at least a processor, and a memory associated with the processor having computer coded instructions therein, with the computer coded instructions configured to, when executed by the processor, cause the apparatus to receive an external communication object from an external email resource, wherein the external email resource is associated with an email address associated with a group-based communication system user identifier. The external communication object corresponds with one of an email or a calendar invite associated with the email address. The memory including the program code is further configured to, with the processor, cause the apparatus to parse the external communication object to identify external communication contextual data. The memory including the program code is further configured to, with the processor, cause the apparatus to identify prioritization data by querying a group-based communication system data corpus. The group-based communication system data corpus comprising group-based communication messaging data, group-based communication channel data, and group-based communication work object data. The memory including the program code is further configured to, with the processor, cause the apparatus to determine a prioritization score for the external communication object. The memory including the program code is further configured to, with the processor, cause the apparatus to, in an instance where the prioritization score exceeds a prioritization score threshold, transmit the external communication object to a client device associated with the group-based communication system user identifier. The external communication object is renderable for display in a group-based communication interface.

In some embodiments, parsing the external communication object, comprises causing the at least one memory and the computer instructions to, when executed by the processor, cause the apparatus to further: generate a prioritization weight estimate for the prioritization data, wherein the prioritization weight estimate is generated using a prioritization recommendation model; and determine the prioritization score for the external communication object based on the generated prioritization weight estimate and the external communication contextual data.

In some embodiments, the prioritization weight estimate comprises a plurality of topic-related weights, for the prioritization data corresponding to a topic work graph determined from the group-based communication system data corpus.

In some embodiments, the prioritization weight estimate comprises a plurality of user-related weights, for the prioritization data corresponding to a user work graph determined from the group-based communication system data corpus. In some embodiments, the memory including the program code is further configured to, with the processor, cause the apparatus to further store the plurality of user-related weights and the plurality of topic related weights in the group-based communication system data corpus.

In some embodiments, the memory including the program code is further configured to, with the processor, cause the apparatus to receive feedback data regarding the prioritization score for the external communication object; and modify a prioritization recommendation model using the feedback data.

In some embodiments, the external communication contextual data comprises one or more of: email subject information, email sender information, email date and time information, email receiver information, email response indicator, calendar invite indicator, calendar invite response indicator, reminder information, or email detail information comprising text, images, audio, files, or work objects. In some embodiments, the work objects comprise one or more of: a file object, a call object, a task object, an event object, a message object, a notification object, or an email object. In some embodiments, the memory including the program code is further configured to, with the processor, cause the apparatus to cause rendering of a user email message interface in a group-based communication interface, wherein the user email message interface is engageable to render the external communication object. In some embodiments, the memory including the program code is further configured to, with the processor, cause the apparatus to cause rendering of a user email message notification in a group-based communication interface.

In another example embodiment, a computer-implemented system may be provided for a computer-implemented method for programmatically managing email data integration between an external email resource associated with a group-based communication system user and a group-based communication system, the method comprises receiving an external communication object from an external email resource. The external email resource is associated with an email address associated with a group-based communication system user identifier. The external communication object corresponds with an email or a calendar invite associated with the email address. The method further comprises parsing the external communication object to identify external communication contextual data. The method further comprises identifying prioritization data by querying a group-based communication system data corpus. The group-based communication system data corpus comprising group-based communication messaging data, group-based communication channel data, and group-based communication work object data. The method further comprises determining a prioritization score for the external communication object. The method further comprises, in an instance where the prioritization score exceeds a prioritization score threshold, transmitting the external communication object to a client device associated with the group-based communication system user identifier. The external communication object is renderable for display in a group-based communication interface.

In some embodiments, parsing the external communication object comprises generating a prioritization weight estimate for the prioritization data, wherein the prioritization weight estimate is generated using a prioritization recommendation model; and determining the prioritization score for the external communication object based on the generated prioritization weight estimate and the external communication contextual data.

In some embodiments, the prioritization weight estimate comprises a plurality of topic-related weights, for the prioritization data corresponding to a topic work graph determined from the group-based communication system data corpus.

In some embodiments, the prioritization weight estimate comprises a plurality of user-related weights, for the prioritization data corresponding to a user work graph determined from the group-based communication system data corpus.

In some embodiments, the method further comprises storing the plurality of user-related weights and the plurality of topic related weights in the group-based communication system data corpus.

In some embodiments, the method further comprises receiving feedback data regarding the prioritization score for the external communication object; and modifying a prioritization recommendation model using the feedback data.

In some embodiments, the external communication contextual data comprises one or more of: email subject information, email sender information, email date and time information, email receiver information, email response indicator, calendar invite indicator, calendar invite response indicator, reminder information, or email detail information comprising text, images, audio, files, or work objects.

In some embodiments, the work objects comprise one or more of: a file object, a call object, a task object, an event object, a message object, a notification object, or an email object.

In some embodiments, the method further comprises causing rendering of a user email message interface in a group-based communication interface, wherein the user email message interface is engageable to render the external communication object.

In some embodiments, the method further comprises causing rendering of a user email message notification in a group-based communication interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
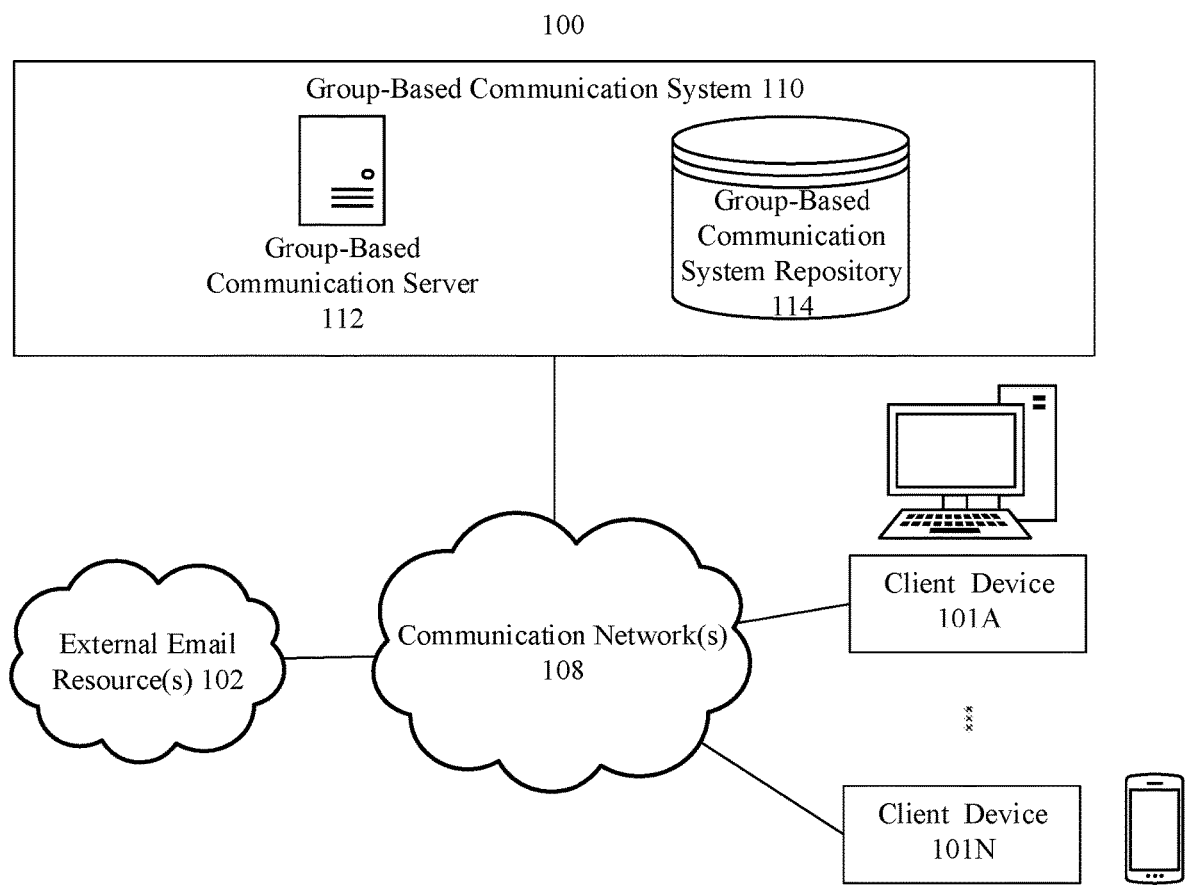
Figure 2:
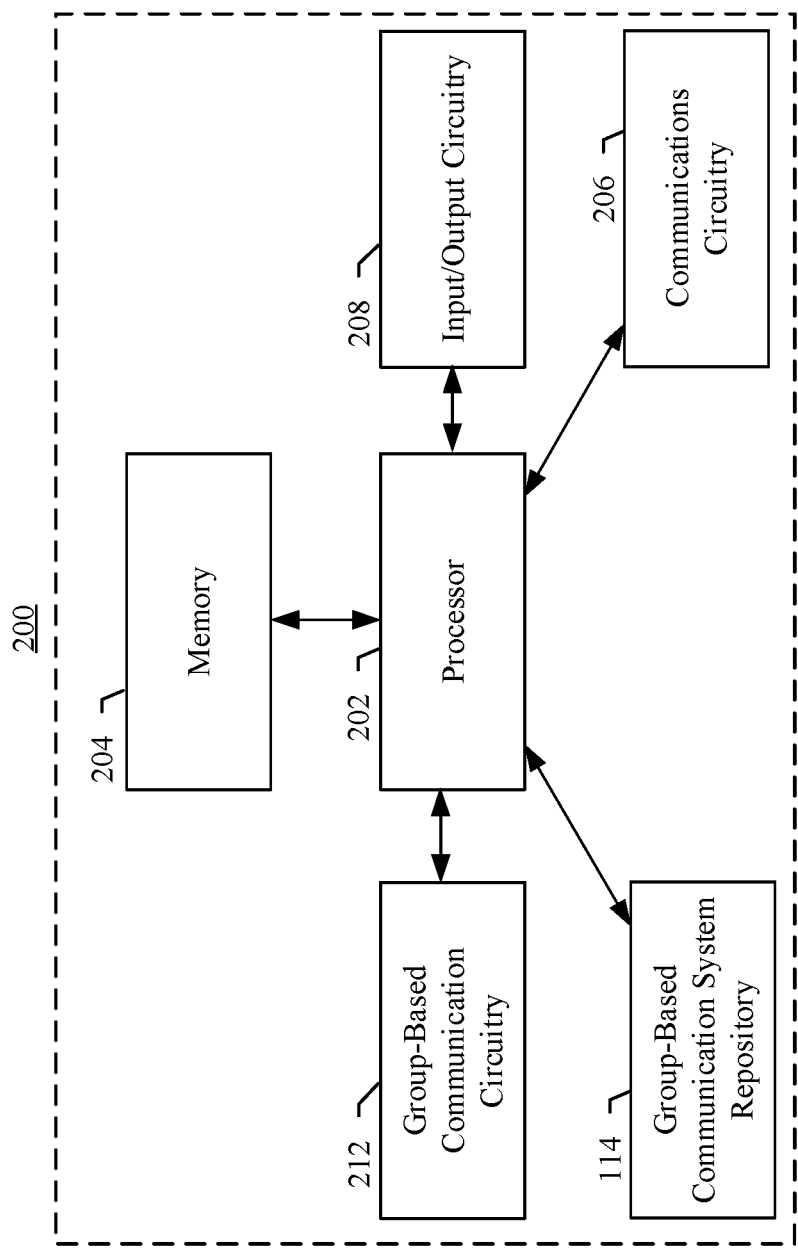
Figure 3:
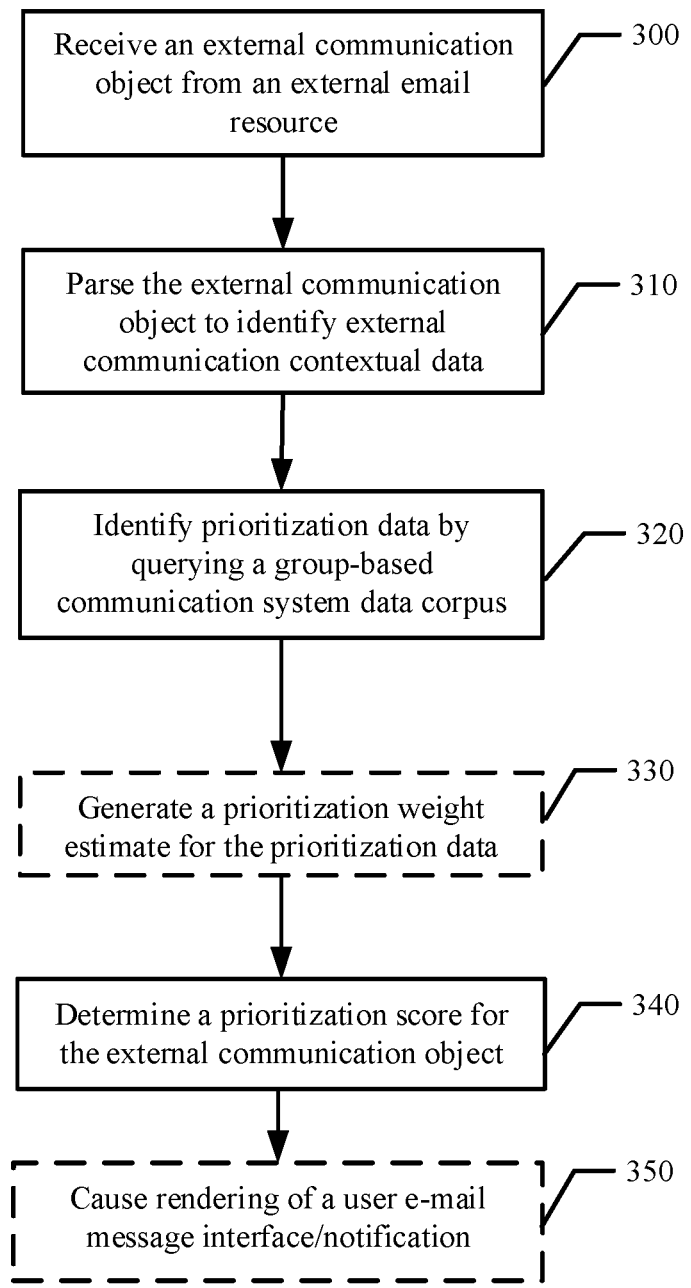
Figure 4:
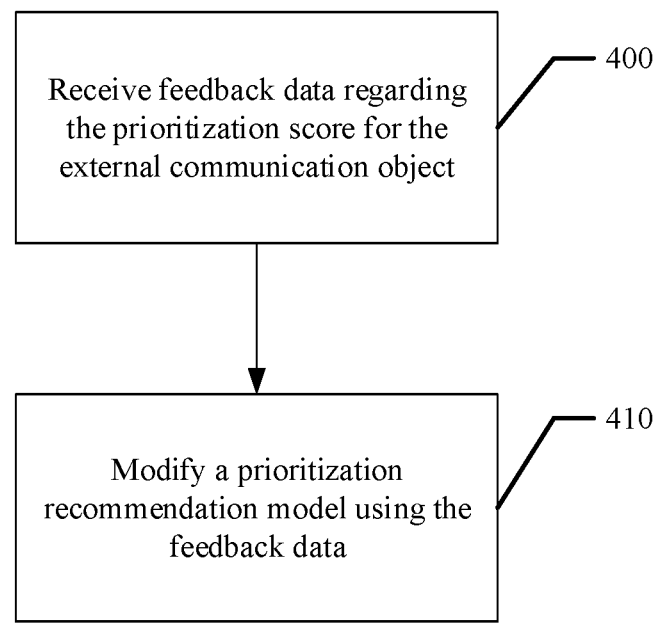

Having thus described the disclosure in general terms, reference will now be made to the accompanying drawings, which are not necessarily drawn to scale, and wherein:

FIG. 1 is a system architecture diagram of an exemplary group-based communication system configured to practice embodiments of the present disclosure;

FIG. 2 is a schematic diagram of an exemplary computing entity according to one embodiment of the present disclosure;

FIG. 3 is a flowchart illustrating operations that are executed by an exemplary group-based communication system for programmatically managing email data integration between an external email resource associated with a group-based communication system user and a group-based communication system, according to embodiments of the present disclosure;

FIG. 4 is a flowchart illustrating operations that are executed by an exemplary group-based communication system for programmatically managing email data integration between an external email resource associated with a group-based communication system user and a group-based communication system, according to embodiments of the present disclosure;

FIGS. 5A-5F illustrate example user email message interfaces according to embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the present disclosure generally relate to a method and apparatus for programmatically managing data integration between an external email resource and a group-based communication system. Example data integration include integrating external communication objects associated with outgoing and incoming emails, calendar invites, and the like.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). Group-based communication system users who access a group-based communication system using a group-based communication interface may be able to participate in discussions occurring in the one or more group-based communication channels. Such a group-based communication system facilitates communications within an organization group.

Group-based communication system users may also have other means of communicating with others, such as email addresses provided by external email resources. Integrating data from such other means of communication is essential for providing group-based communication system users with a better user engagement experience. Managing such data integration is vital for ensuring efficient computing resource usage, efficient network bandwidth usage, security, and user engagement experience of the group-based communication system. For example, without an efficient mechanism for managing such data integration, a group-based communication system may store and render an excess of data from external email resources, resulting in inefficient computing resource and network bandwidth usage. Such inefficient computing resource and network bandwidth usage may interfere with other operations of the group-based communication system which in turn lowers operational stability of the group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user of a group-based communication system. The association may be created by way of the client device transmitting registration information for the user to a group-based communication system. In some instances, a client device may be temporarily associated with a user (e.g., only when a user is logged onto the group-based communication system app). In such embodiments, the group-based communication system may receive registration information indicating the user is associated with a client device (e.g., a user may input a serial number of the client device to be associated with the user into the group-based communication system).

Client devices configured in accordance with embodiments described herein are configured to generate geographic location data and/or contextual location data. The term "geographic location data" refers to location data (e.g., latitude and longitude coordinates) that is generated by a global positioning system (GPS) receiver housed within the client device. The GPS receiver receives clock data transmitted by one or more geostationary satellites (e.g., a satellite in a known or knowable position) and/or one or more ground based transmitters (e.g., also in known or knowable positions), compares the received clock data, and computes the geographic location data, which represents a near real-time position for the client device. The term "contextual location data" refers to position or location information that is derived by the client device (or by separate server) based on interactions between the client device and local networks, objects, or devices. Example contextual location data could be derived based on reference to known locations for Wi-Fi routers or Bluetooth devices that are configured to communicate with a client device. A client device may also generate contextual location information based on communicating with radio-frequency identification (RFID) readers or tags, or barcode readers or tags, having known positions.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface.

The term "group-based communication server" refers to a software platform and associated hardware that is configured to manage access to the various group-based communication interfaces of the group-based communication system. The group-based communication server is configured to access, maintain, and support application product logic of the group-based communication system and to access one or more data repositories such as a group-based communication repository.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. Users referred to herein are discussed largely in connection with client device enabled activity for accessing a group-based communication interface (or set of group-based communication interfaces) of a group-based communication system.

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be uniquely identified. For example, a group identifier may comprise ASCII text, a pointer, a memory address, and the like. For example, the group identifier associated with member users of a Slack Corporation workspace (i.e., a group-based communication interface) may be 104356721.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication repository" refers to a location outside the client device where group-based communication data corpus is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

The terms "external work object" or "remote work object" refer to a data structure or a dataset that is received from a validated external resource by a group-based communication system for representing files, calls, tasks, events, messages, notifications, calendar invites, and/or emails that a validated external resource transmits, posts, or shares on behalf of a group-based communication channel member for rendering to a group-based communication interface. An external work object may comprise a file object, a call object, a task object, an event object, a message object, a notification object, or an email object. An external work object may be associated with a user identifier.

The terms "internal work object" or "group-based work object" refer to a data structure or a dataset created by the group-based communication system and reflects data about files, calls, tasks, events, messages, notifications, calendar invites, and/or emails posted by a group-based communication channel member to a group-based communication interface. An internal work object may comprise a file object, a call object, a task object, an event object, a message object, a notification object, or an email object. The internal work object may be associated with one or more of a group-based communication channel member, a group-based communication message, a group-based communication channel, and another external or internal work object. In order to process external work object, a group-based communication system may convert external work object to internal work object.

The term "external communication object" refers to a data structure or a dataset that is received from an external email resource to a group-based communication system for representing an email or a calendar invite. External communication contextual data is derived from the external communication object. An external communication object further comprises a communication identifier.

The term "internal communication object" refer to a data structure or a dataset created by the group-based communication system and reflects data about an email or a calendar invite represented by an external communication object. The internal communication object is identified by a communication identifier. In order to process external communication object, a group-based communication system may convert external communication object to internal communication object.

A "communication identifier" is associated with one or more items of data by which an internal or external communication object may be uniquely identified within a group-based communication system. For example, a communication identifier may comprise ASCII text, a pointer, a memory address, and the like. In one embodiment, the communication identifier associated with an external communication object is encoded when transmitting to a validated external resource.

The term "external communication contextual data" refers to data that is extracted or derived from a communication object that is used by a group-based communication system to position an associated email or calendar invite in a group-based communication interface, such as a user email message interface. The group-based communication system is configured to identify prioritization data associated with an external communication object based, at least in part, on the external communication contextual data. The external communication contextual data associated with a includes one or more of: email/calendar invite subject/title information, email/calendar invite date and time information, email/calendar sender information, email/calendar receiver information, alerts/reminders, email/calendar response indicator that indicates an action taken, such as accept, decline, respond, move to spam, forward, or the like, reminder information, or email/calendar invite detail information comprising text, images, audio, files, or work objects, objects attached to the email or calendar invite (e.g., a call, a file, a video, tasks) or one or more predefined data fields. The external communication contextual data may further include a user identifier, one or more group-based communication channel identifiers associated with group-based communication channels that the user has been granted access to, one or more group identifiers for groups with which the user is associated, message identifier, event identifier, or work object identifier. The group-based communication system may be configured to further facilitate indexing the external communication contextual data.

The terms "internal work object" or "group-based work object" refer to a data structure or a dataset created by the group-based communication system and reflects data about files, calls, tasks, events, messages, notifications, calendar invites, and/or emails posted by a group-based communication channel member to a group-based communication interface. An internal work object may comprise a file object, a call object, a task object, an event object, a message object, a notification object, or an email object. The internal work object is associated with one or more of a group-based communication channel member, a group-based communication message, a group-based communication channel, and another external or internal work object.

The term "prioritization data" refers to queried data of a group-based communication system data corpus that may be used to determine or includes, by way of example, one or more of: a user to content affinity score, a user to user link score, or a response indicator. The common identifier data is used by the group-based communication system to identify a selected user of the group-based communication system. Prioritization data embodies a digital record of the selected user's engagement of and interaction with the group-based communication system and any associated validated external resources and internal or external work objects. In some embodiments, a portion of prioritization data may be gathered by the group-based communication system by synchronizing part or all of user data associated with user from the external email resource. Prioritization data is a compiled set of data and data structure associations that reveal user associated insights concerning an external communication object. The group-based communication system is configured to identify prioritization data by querying a group-based communication system data corpus using at least in part on a user identifier.

A user to user link score is a numerical value representing a user's association with other users. In some embodiments, a user to user link score is derived using a user work graph. A user work graph is a graph-based knowledge representation data structure applied to the group-based communication system data corpus that represents a user's associations to other users. Such other users may be drawn from group-based communication messaging data, external communication objects, or the like. In one implementation, user to user data include how many messages from another user the user read, how many messages of another user the user reacted to, how many direct messages the user sent to another user, how many channels the user and another user joined in common, how many emails are transmitted from an email address and/or the like. Additionally or alternatively, user to user data include such as how many emails are transmitted between email addresses associated with the user and another user, recentcy of the emails transmitted between the email addresses associated with the user and another user, and/or the like. A weighted average of user to user data may be calculated for each of the other users from the perspective of the selected user, and the resulting scores normalized so that each of the other users is assigned a user to user link score (e.g., in the 0 to 1 range) from the perspective of the user.

A user to content affinity score is a numerical value representing a user's associations to topics. In some embodiments, a user to user link score is derived using a topic work graph. A topic work graph is a graph-based knowledge representation data structure applied to the group-based communication system data corpus that represents a user's associations to topics. Such topics may be drawn from group-based communication messaging data, group-based communication channel data, and group-based communication work object data and external communication object. In some embodiments, topics may be identified from a group-based communication message or an external communication object. The message contents or the content in the external communication may be parsed (e.g., using PHP commands) to determine topics discussed in the message/email. For example, hashtags in the message/email may indicate topics associated with the message/email. In another example, the message/email may be analyzed (e.g., by itself, with other messages/emails in a conversation primitive or parsed using a machine learning technique, such as topic modeling, to determine topics associated with the message. The topic work graph may indicate, for example, how many messages/emails a user sent regarding a topic, how many messages the user read regarding the topic, how many reactions to the user's messages/emails regarding the topic have been received, how many times files regarding the topic that were attached to the user's messages/emails have been downloaded by other users, how many times files regarding the topic have been downloaded by the user, and relative strengths of the user's associations with such topics. This data structure may be used to calculate a prioritization weight estimate of the topic to the user. For example, a weighted average of user to topic data may be calculated for each topic (e.g., each topic discussed by the team, each topic discussed at the company), and the resulting scores normalized so that each of the topics is assigned a prioritization weight estimate (e.g., in the 0 to 1 range) from the perspective of the user.

A "channel work graph" is a graph-based knowledge representation data structure applied to the group-based communication system data corpus that represents a user's associations to group-based communication channels. In another embodiment, such channel work graph may represent associations between channels without respect to a selected user. Returning to user-channel associations, in one example, the channel work graph may include associations developed based on whether the user joined a channel, how many messages the user sent in the channel, how many messages the user read in the channel, how often the user checks the channel, whether the user starred the channel, how similar the channel is to other channels the user participates in, and/or the like may be used to calculate a channel priority (e.g., a channel priority score) of the channel to the user. For example, a weighted average of user to channel data may be calculated for each channel (e.g., each channel accessible to the team, each channel accessible to the company), and the resulting scores normalized so that each of the channels is assigned a channel priority score (e.g., in the 0 to 1 range) from the perspective of the user.

The term "validated external resource" refers to a software program, application, platform, or service that is configured to communicate with the group-based communication system for providing service to a client device via a group-based communication interface. The validated external resource operates on a compiled code base or repository that is separate and distinct from that which supports the group-based communication system. In some embodiments, the validated external resource may communicate with the group-based communication system, and vice versa, through one or more application program interfaces (APIs). In some embodiments, the validated external resource receives tokens or other authentication credentials that are used to facilitate secure communication between the validated external resource and the group-based communication system in view of group-based communication system network security layers or protocols (e.g., network firewall protocols).

The term "external email resource" refers to a validated external resource that takes the form of a software program, application, platform, or service that is configured to provide electronic mail ("email") services to users operating client devices. The external email resource comprises an email client, a simple mail transfer protocol ("SMTP") server, and a domain name server ("DNS"). The external email resource is configured to allow a sending user ("a sender") to create and transmit an email message to a receiving user ("a recipient"). Each email message comprises an email envelope that defines its electronic format, an email header that includes sender/recipient information and an email subject line, and an email body that includes text, images, and file attachments. The external email resource operates on a compiled code base or repository that is separate and distinct from that which supports the group-based communication system. Example external email resources include Microsoft Office 365®, Gmail®, and Yahoo Mail®. An external email resource may be associated with several external email resource entities of one or more users.

An email client of the external email resource may be used by a sender to create and transmit an email message. The email message text and attachments are thus uploaded to the SMTP server as outgoing mail. A copy of the email message is stored to an email outbox associated with the sender for later retrieval. The SMTP server communicates with the DNS to find a recipient email server using recipient information drawn from the email header. Once the SMTP server finds the recipient email server, it transfers the email message to the recipient email server. The next time the recipient accesses the email client, the email client downloads the email message from the recipient email server for presentation to the recipient in an email inbox interface. The external email resource may also include programs, applications, platforms, or services configured to provide services related to providing email services.

An external email resource may receive communication message data associated with a group-based communication message from the group-based communication system. The communication message data may be templated or structured template information that is consistent with the email client that is to receive this data. The communication message data may be rendered as a hybrid email object by an email client. As used herein, the term "hybrid email object" refers to data rendered by an email client that includes text, emoji, or other data originated from a group-based communication system. An external email resource may transmit an invite request confirmation to the group-based communication system based on engagement from a limited user with an email client associated with an external email resource entity associated with the external email resource. An external email resource may also transmit external message data comprising a group identifier and a group-based communication channel identifier to a group-based communication system. The group-based communication system may parse the external message data and render a group-based communication message based on the external message data to the group-based communication channel identified by the group-based communication channel identifier in the external message data.

The term "external email resource entity identifier" refers to one or more items of data by which a user of an external email resource may be uniquely identified by a group-based communication system. For example, an external email resource entity identifier may comprise American Standard Code for Information Interchange (ASCII) text, a pointer, a memory address, and the like. One or more external email resource entity identifiers may be stored to a limited profile of a group-based communication system along with other identifiers (e.g., user identifier, group identifiers, group-based communication channel identifiers, etc.). The external email resource entity identifier may be embodied in a format native to the external email resource to which it is associated or may be structured in a format designated by the group-based communication system. Correlating one or more external email resource entity identifiers to a user account or user identifier of the group-based communication system allows the group-based communication system to link accounts from disparate external email resources with a selected group-based communication system user account.

The terms "user profile," "user account," "regular user profile", and "user account details" refer to data, files, and other information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, a status, and the like. The user account details can include a subset designation of user credentials, such as, for example, login information for the user including the user's username and password.

The term "conversation primitive" is associated with a message and refers to an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. The conversation primitives are also used for shingling and searching over conversations (the messages and their surrounding messages). As used herein, the term "message send order proximity" refers to a proximity measure for messages associated with the same channel identifier determined based on number of messages with the same channel identifier with time stamp data between two or more communication messages in the same group-based communication channel. In one example embodiment, if a user sends communication message A in a particular group-based communication channel and another user sends communication message B in the same channel before any other communication message is posted in the channel, message A and message B would be determined to have message send order proximity of 1 which indicates highest possible proximity in this embodiment.

As used herein, the term "message send time proximity" refers to a proximity measure determined based on difference of time in time stamp data associated with two or more communication messages in the same group-based communication channel. In one example embodiment, if a user sends communication message A in a particular group-based communication channel at 19:02:35 and another user sends communication message B in the same channel at 19:02:40, message A and message B would be determined to have message send time proximity of 5.

As used herein, the term "user email message interface" refers to an interface environment of a group-based communication interface that comprises renderings of one or more high priority external communication objects. In some embodiments, the user email message interface provides a user of a client device a consolidated view of external communication objects of high priority.

As used herein, the term "user email message notification" refers to a rendered graphical element in a group-based communication interface that comprises a notification related to one external communication object. In some embodiments, the user email message interface provides a user of a client device a notification of an external communication object of high priority.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 110 via a communications network 108 using client devices 101A-N. The group-based communication system 110 may comprise a group-based communication server 112 in communication with at least one group-based communication system repository 114.

Users using client device 101A-N may access and communicate with one or more external email resources 102 through communications network 108. In some examples, external email resources 102 may include Microsoft Office 365®, Gmail®, Yahoo Mail®, and the like. The external email resources 102 are separate from the group-based communication system 110. For example, the external email resources 102 and the group-based communication system 110 may be operated by different entities. The external email resources 102 can also be separate from the group-based communication system 110 in the sense that the external email resources 102 are associated with one domain while the group-based communication system 110 is associated with a separate domain. The external email resource 102 provide email service(s) via an email client and one or more supporting servers over the communications network 108.

A share API component of the group-based communication server 112 provides an interface to integrate external email resources 102 with the group-based communication system 110 for the communication/exchange of information associated with external communication objects. In various embodiments, the share API defines the protocol and procedural steps by which external email resources 102 may make its external communication objects available for managing by the group-based communication system 110. The share API further defines the security and authentication protocols that govern communications between the remote resource and the group-based communication system.

Communications network 108 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 108 may include a cellular telephone, an 802.11, 802.16, 802.20, and/or WiMax network. Further, the communications network 108 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication server 112 may be embodied as a computer or computers as configured herein. The group-based communication server 112 may provide for receiving of electronic data from various sources, including but not necessarily limited to the client devices 101A-N. For example, the group-based communication server 112 may be operable to receive and post or transmit group-based messaging communications provided by the client devices 101A-N.

The group-based communication system repository 114 may be embodied as a data storage device such as a Network Attached Storage (NAS) device or devices, or as a separate database server or servers. The group-based communication system repository 114 includes information accessed and stored by the group-based communication server 112 to facilitate the operations of the group-based communication system 110. For example, the group-based communication system repository 114 may store, without limitation, group-based communication data corpus such as a plurality of messaging communications organized among a plurality of group-based communication channels, and/or the like.

The client devices 101A-N may be any computing device as defined above. Electronic data received by the group-based communication server 112 from the client devices 101A-N may be provided in various forms and via various methods. For example, the client devices 101A-N may include desktop computers, laptop computers, smartphones, netbooks, tablet computers, wearables, and the like.

In embodiments where a client device 101A-N is a mobile device, such as a smartphone or tablet, the client device 101A-N may execute an "app" to interact with the group-based communication system 110. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-N may interact with the group-based communication system 110 via a web browser. As yet another example, the client device 101A-N may include various hardware or firmware designed to interface with the group-based communication system 110.

In some embodiments of an exemplary group-based communication system 110, a message or messaging communication may be sent from a client device 101A-N to a group-based communication system 110. In various implementations, the message may be sent to the group-based communication system 110 over communications network 108 directly by a client device 101A-N, the message may be sent to the group-based communication system 110 via an intermediary such as a message server, and/or the like. For example, the client device 101A-N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), external calendar resource metadata, and/or the like. In one embodiment, the client device 101A-N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
```

```
    //OPTIONAL <digital_certificate>_DATA_</digital_certificate>
  </user_account_credentials>
 </user_accounts_details>
 <client_details> //iOS Client with App and Webkit
    //it should be noted that although several client details
    //sections are provided to show example variants of client
    //sources, further messages will include only one to save
    //space
    <client_IP>10.0.0.123</client_IP>
    <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
  <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app_with webkit</client_app_type>
    <app_installed_flag>true</app_installed_flag>
    <app_name>nickname.app</app_name>
    <app_version>1.0 </app_version>
    <app_webkit_name>Mobile Safari</client_webkit_name>
    <client_version>537.51.2</client_version>
 </client_details>
 <client_details> //iOS Client with Webbrowser
    <client_IP>10.0.0.123</client_IP>
    <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
  <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
 </client_details>
 <client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
 </client_details>
 <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
 </client_details>
 <message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
policy.</contents>
    <attachments>patent_policy.pdf</attachments>
 </message>
</auth_request>
```

The group-based communication system 110 comprises at least one group-based communication server 112 that may create a storage message based upon the received message to facilitate message indexing and storage in the group-based communication system repository 114. In one implementation, the storage message may include data such as a message identifier, a group identifier, a group-based communication channel identifier, a sending user identifier, topics, responses, message contents, attachments, message hierarchy data, external calendar resource metadata, conversation primitive data, and/or the like. For example, the group-based communication server 112 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
  <?XML version = "1.0" encoding = "UTF-8"?>
  <storage_message>
  <message_identifier>ID_message_10</message_identifier>
  <team_identifier>ID_team_1</team_identifier>
  <channel_identifier>ID_channel_1</channel_identifier>
  <sending_user_identifier>ID_user_1</sending_user_identifier>
  <topics>
     <topic>disclosures</topic>
     <topic>patents</topic>
     <topic>policies</topic>
  </topics>
  <responses>
     <response>liked by ID_user_2</response>
     <response>starred by ID_user_3</response>
  </responses>
  <contents>That is an interesting disclosure. I have attached a copy our patent
  policy.</contents>
  <attachments>patent_policy.pdf</attachments>
  <conversation_primitive>
     conversation includes messages: ID_message_8, ID_message_9, ID_message_10,
        ID_message_11, ID_message_12
  </conversation_primitive>
</storage_message>
```

In some embodiments, a group identifier may be associated with the message.

In some embodiments, a group-based communication channel identifier may be associated with the message.

In embodiments, a sending user identifier may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, external email resource metadata may be associated with the message. For example, external email resource metadata may provide additional context regarding the message or the user that is specific to a company, group, group-based communication channel, and/or the like. In one implementation, the message may be parsed (e.g., using PHP commands) to determine external calendar resource metadata. For example, external calendar resource metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication system data corpus 114). In one implementation, a storage message may be sent from group-based communication server 112 to facilitate indexing in group-based communication system data corpus 114. In another implementation, metadata associated with the message may be determined and the message may be indexed in group-based communication system data corpus 114. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication system data corpus 114 to facilitate searching. In one embodiment, the files may be indexed such that a company's or a group's files are indexed at a separate distributed repository.

Examples of messaging search and management apparatuses and methods for use with embodiments of the present disclosure are disclosed in U.S. patent application Ser. No. 15/604,584, titled "MESSAGING SEARCH AND MANAGEMENT APPARATUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, the contents of which are incorporated herein by reference in their entirety. The examples include metadata extraction and work graph generation, as well as application of machine learning techniques for embodiments of the present disclosure.

Example Group-Based Communication System Configuration

FIG. 2 shows a schematic block diagram of circuitry 200, some or all of which may be included in, for example, group-based communication server 112 and/or client devices 101A-N. Any of the aforementioned systems or devices may include the circuitry 200 and may be configured to, either independently or jointly with other devices in a communications network 108 perform the functions of the circuitry 200 described herein. As illustrated in FIG. 2, in accordance with some example embodiments, circuitry 200 can includes various means, such as processor 202, a memory 204, input/output circuitry 208, communications circuitry 206, and group-based communication circuitry 212. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 206 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 101A-N to enable message sharing there between. The processor 202 ensures that messages intended for exchange between the client devices 101A-N within the particular communication channel are properly disseminated to those client devices 101A-N for display within respective display windows provided via the client devices 101A-N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101A-N.

In some embodiments, the apparatus 200 may include input/output circuitry 208 that may, in turn, be in communication with processor 202 to provide output to the user and, in some embodiments, to receive an indication of a user input. The input/output circuitry 208 may comprise a user interface and may include a display and may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 212 includes hardware configured to support a group-based communication system. The group-based communication circuitry 212 may utilize processing circuitry, such as the processor 202, to perform these actions. The group-based communication circuitry 212 may send and/or receive data from group-based communication system data corpus 114. In some implementations, the sent and/or received data may be of digital content objects organized among a plurality of group-based communication channels. It should also be appreciated that, in some embodiments, the group-based communication circuitry 212 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Example Group-Based Communication System Operations

Referring now to FIG. 3, a flowchart is provided to illustrate operations that are executed by an example embodiment of an apparatus used to embody various components of the group-based communication system 110, such as the group-based communication server 112, for programmatically managing email data integration between an external email resource associated with a group-based communication system user and a group-based communication system. FIG. 3 and other flowcharts herein are for illustrative purposes and are not to be limiting unless otherwise stated herein. Unless otherwise noted, various operations discussed in FIG. 3 and other flowcharts may be used in the same or separate embodiments of the present disclosure.

As shown in Block 300 of FIG. 3, the apparatus includes means, such as the communications circuitry 206, processor 202, or the like, for receiving an external communication object from an external email resource. The external email resource is associated with an email address associated with a group-based communication system user identifier. The external communication object corresponds with an email or a calendar invite associated with the email address. The form of the external communication object varies according to the external email resource(s) 102.

The external email resources 102 operate on a compiled code base or repository that is separate and distinct from that which supports the group-based communication system. In some embodiments, the external email resources 102 may communicate with the group-based communication system, and vice versa, through one or more application program interfaces (share APIs). In some embodiments, the external email resources 102 receive tokens or other authentication credentials that are used to facilitate secure communication between the external email resources 102 and the group-based communication system in view of group-based communication system network security layers or protocols (e.g., network firewall protocols). For purposes of illustration and not of limitation, consider an example in which the share API facilitates communications between the group-based communication system and external email resources 102 for data associated with external communication objects.

External communication contextual data may be derived from the external communication object. An external communication object includes a communication identifier.

A communication identifier is associated with one or more items of data by which an external communication object may be identified within a group-based communication system. For example, a communication identifier may comprise ASCII text and the like. In one embodiment, the communication identifier associated with an external communication object is encoded when transmitting to a validated external resource.

As shown in Block 310 of FIG. 3, the apparatus includes means, such as the processor 202 or the like, for parsing the external communication object to identify external communication contextual data. External communication contextual data is used by the group-based communication system 110 to position an associated email or calendar invite in a group-based communication interface, such as a user email message interface. The external communication contextual data associated with a includes one or more of: email/calendar invite subject/title information, email/calendar invite date and time information, email/calendar sender information, email/calendar receiver information, alerts/reminders, email/calendar response indicator that indicates an action taken, such as accept, decline, respond, move to spam, forward, or the like, reminder information, or email/calendar invite detail information comprising text, images, audio, files, or work objects, objects attached to the email or calendar invite (e.g., a call, a file, a video, tasks) or one or more predefined data fields. The external communication contextual data may further include a user identifier, one or more group-based communication channel identifiers associated with group-based communication channels that the user has been granted access to, one or more group identifiers for groups with which the user is associated, message identifier, event identifier, or work object identifier. The group-based communication system may be configured to further facilitate indexing the external communication contextual data.

As shown in Block 320 of FIG. 3, the apparatus includes means, such as the processor 202 or the like, for identifying prioritization data by querying a group-based communication system data corpus. The group-based communication system data corpus includes group-based communication messaging data, group-based communication channel data, and group-based communication work object data. In some embodiments, data used for querying the group-based communication system data corpus include the group-based communication system user identifier associated with the email address associated with associated with the external email resource and the external communication contextual data. Potential identified prioritization data includes or may be used to determine, by way of example, one or more of: a user to content affinity score, a user to user link score, or a response indicator.

A user to user link score is a numerical value representing a user's association with other users. In some embodiments, a user to user link score is derived using a user work graph. A user work graph is a graph-based knowledge representation data structure applied to the group-based communication system data corpus that represents a user's associations to other users. Such other users may be drawn from group-based communication messaging data, external communication objects, or the like. In one implementation, user to user data include how many messages from another user the user read, how many messages of another user the user reacted to, how many direct messages the user sent to another user, how many channels the user and another user joined in common, how many emails are transmitted from an email address, and/or the like. Additionally or alternatively, user to user data include such as how many emails are transmitted between email addresses associated with the user and another user, timestamp of the most recent email transmitted between the email addresses associated with the user and another user, how many times were the emails transmitted on a weekend, frequency of emails transmitted in a pre-defined time period, frequency of emails transmitted outside pre-defined normal business hours, frequency of emails transmitted where the email address associated with the user is the outgoing entity, and/or the like. A weighted average of user to user data may be calculated for each of the other users from the perspective of the selected user, and the resulting scores normalized so that each of the other users is assigned a user to user link score (e.g., in the 0 to 1 range) from the perspective of the user.

A user to content affinity score is a numerical value representing a user's associations to topics. In some embodiments, a user to user link score is derived using a topic work graph. A topic work graph is a graph-based knowledge representation data structure applied to the group-based communication system data corpus that represents a user's associations to topics. Such topics may be drawn from group-based communication messaging data, group-based communication channel data, and group-based communication work object data and external communication object. In some embodiments, topics may be identified from a group-based communication message or an external communication object. The message contents or the content in the external communication may be parsed (e.g., using PHP commands) to determine topics discussed in the message/email. For example, hashtags in the message/email may indicate topics associated with the message/email. In another example, the message/email may be analyzed (e.g., by itself, with other messages/emails in a conversation primitive or parsed using a machine learning technique, such as topic modeling, to determine topics associated with the message. The topic work graph may indicate, for example, how many messages/emails a user sent regarding a topic, how many messages the user read regarding the topic, how many reactions to the user's messages/emails regarding the topic have been received, how many times files regarding the topic that were attached to the user's messages/emails have been downloaded by other users, how many times files regarding the topic have been downloaded by the user, and relative strengths of the user's associations with such topics. This data structure may be used to calculate a prioritization weight estimate of the topic to the user. For example, a weighted average of user to topic data may be calculated for each topic (e.g., each topic discussed by the team, each topic discussed at the company), and the resulting scores normalized so that each of the topics is assigned a prioritization weight estimate (e.g., in the 0 to 1 range) from the perspective of the user.

A response indicator indicates an action taken, such as accept, decline, respond, move to spam, forward, or the like, reminder information, or email/calendar invite detail information comprising text, images, audio, files, or work objects, objects attached to the email or calendar invite (e.g., a call, a file, a video, tasks) or one or more predefined data fields.

As shown in optional Block 330 of FIG. 3, the apparatus includes means, such as the processor 202 or the like, for generating a prioritization weight estimate for the prioritization data. As shown in Block 340 of FIG. 3, the apparatus includes means, such as the processor 202 or the like, for determining a prioritization score for the external communication object.

In some embodiments, the apparatus may utilize a machine learning model for work graph/machine learning processing to analyze the prioritization data to generate the prioritization weight estimate for the prioritization data. In some example embodiments, the group-based communication server 112 is configured to obtain one or more work graphs such as a topic work graph, a user work graph, or a channel work graph from a prioritization recommendation model.

The work graphs may include attributes of work graph data represented as nodes while associations between such attributes are represented as edges. The prioritization recommendation model is a machine learning based model for relational clustering that seeks to identify cluster structures for each work object or external communication object based on a work graph. Work graph data may be used as machine learning structure inputs for training and/or utilizing the prioritization recommendation model. In addition, response indicators may be used as machine learning structure inputs for training and/or utilizing the prioritization recommendation model. A work graph shows strengths of relationships between users and topics that may facilitate prioritization. In one example embodiment, the group-based communication server 112 may generate the prioritization recommendation model to assign prioritization scores for a given user, external communication object, message, topic, and/or work object at a given time.

In some embodiments, the strength of relationship among users, channels, topics, and work objects may be measured by engagement. In some embodiments, a topic may be considered important or a high priority if the user is highly engaged with the topic and another user or an email address may be considered important or a high priority if the user is highly engaged with the other user or email address. As such, the group-based communication server is configured to track, by using the prioritization recommendation model, various engagement that includes: clicks, reactions, replies, file clicks, external clicks, mentions, shares, starts, implicit replies, pins, reads, external communications transmitted or received, or selections.

The one or more work graphs may be used to calculate a prioritization weight estimate of the topic to the user. The prioritization weight estimate may comprise a plurality of topic-related weights and user-related weights for the prioritization data corresponding to an associated topic work graph or user work graph determined by the group-based communication system data corpus. For example, a weighted average of user to user data may be calculated for each of the other users from the perspective of the user, and the resulting scores normalized so that each of the other users is assigned a user priority score (e.g., in the 0 to 1 range) from the perspective of the user. The prioritization recommendation model may utilize one or more machine learning techniques, such as random forest machine learning model, a logistic regression machine learning model, or a neural network to generate the weight estimates.

In some embodiments, the apparatus utilizes the prioritization weight estimate to determine the prioritization weight score. In some embodiments, the apparatus determines the prioritization weight score by using a set of pre-defined rules based on the external communication contextual data as an alternative to or to supplement the prioritization weight scores. For example, the pre-defined rules may define that external communication objects associated with calendar invites, received replies from emails sent out from the email address associated with the external email resource, attachments, embedded text with a length higher than a threshold, urgency token, and a pre-defined set of topics such as meeting, appointment request, task assignment, and information request are of high priority score or need to be supplemented with a high priority modifier. The pre-defined rules may further define that external communication objects associated with a pre-defined set of topics such as "Do Not Reply", marketing, no attachments, embedded text with a length lower than a threshold, no urgency token, and embedded unsubscribe links, are of low priority score or need to be supplemented with a low priority modifier. In some embodiments, the pre-defined rules may further define that external communication objects that indicate that emails or calendar invites associated with the external communication objects are transmitted from an email resource identical with the external email resource transmitting the external communication objects to the group-based communication system are of high priority or need to be supplemented with a high priority modifier.

In some embodiments, the apparatus may store the generated prioritization weight estimates and/or scores, by way of example, including the user-related weights and the topic-related weights, in the group-based communication system data corpus.

As shown in optional Block 350 of FIG. 3, the apparatus includes means, such as the processor 202 or the like, for causing rendering (by way of transmitting instructions to a client device) of a user email message interface or a user email notification. A user email message interface is an interface environment of a group-based communication interface that comprises renderings of one or more high priority external communication objects. In some embodiments, the user email message interface provides a user of a client device a consolidated view of external communication objects of high priority. In some embodiments, the user email message interface provides a consolidated view of all external communication objects if the amount of external communication objects received is lower than a pre-defined threshold. Examples of the user email message interface is provided in FIGS. 5A to 5F.

The user email message notification is a rendered graphical element in a group-based communication interface that comprises a notification related to a high priority external communication object.

Referring now to FIG. 4, a flowchart is provided to illustrate operations that are executed by an example embodiment of an apparatus used to embody various components of the group-based communication system 110, such as the group-based communication server 112, for programmatically managing email data integration between an external email resource associated with a group-based communication system user and a group-based communication system. As shown in Block 400 of FIG. 4, the apparatus includes means, such as the processor 202, the communications circuitry 206 or the like, for receiving feedback data regarding the prioritization score for the external communication object. In some embodiments, the feedback data may be aggregated data generated based on one or more external communication objects.

In some embodiments, the feedback data may be one or more external communication objects. In some embodiments, feedback data may be generally categorized into precision related and recall related feedback data. Both precision related and recall feedback data include data generated based on response indicators. In some embodiments, precision related feedback data may be aggregated in the form of, by way of example, out of a pre-defined number of external communication objects determined to be high priority, how many were actioned upon in the form of reply, forward, accept, or the like. In some embodiments, recall related feedback data may be aggregated in the form of, by way of example, out of a pre-defined number of external communication objects that were actioned upon, how many were determined to be of high priority.

As shown in Block 410 of FIG. 4, the apparatus includes means, such as the processor 202, the communications circuitry 206 or the like, for modifying a prioritization recommendation model using the feedback data. The feedback data may be used as training data for the prioritization recommendation model.

Example User Email Message Interface

Figure 5A:

FIGS. 5A-5F illustrate example user email message interfaces according to embodiments of the present disclosure. As illustrated in FIG. 5A, the user email message interface includes a rendered message 512 that includes text 514 extracted from the external communication object. The user email message interface may take the form of an engageable email bot 510. A user may send one or more messages and/or commands to the email bot 510 by providing user input to the client device, which may in turn transmit data representative of the one or more messages and/or commands to the group-based communication system.

Figure 5B:

As illustrated in FIG. 5B, the email bot 510 may include one or more high priority "VIP emails" 520 which are representative of one or more high priority external communication objects. The email bot 510 may be engageable to display text, emoji, or links in the one or more external communication objects associated with the high priority "VIP emails" 520. The email bot 510 may further include one or more moderate priority "priority emails" 522 which are representative of one or more moderate priority external communication objects. A user may be able to engage with the email bot 510 by instructing a client device to send one or more messages and/or commands to the group-based communication system by typing in the input field 524.

Figure 5C:

As illustrated in FIG. 5C, in some embodiments, the user email message interface may take the form of an email bot that may be engageable to render, but does not initially render, the one or more external communication objects.

Figure 5D:
Figure 5D:
Figure 5D:
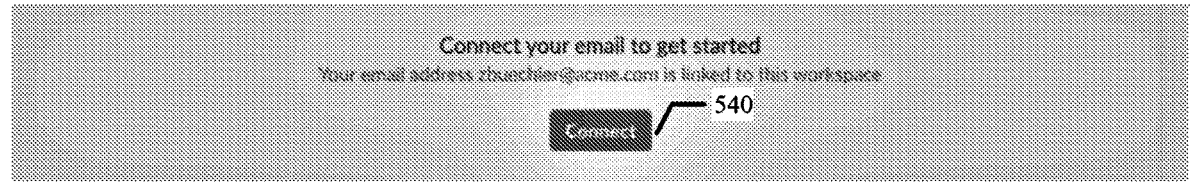

As illustrated in FIG. 5D, the user email message interface may take the form of an email bot that may be configured to receive user input indicating an association between an external email resource entity and a user profile associated with the user. The user may engage with the embedded "connect" button 540 to provide such user input.

Figure 5E:

As illustrated in FIG. 5E, the user email message interface that takes the form of an email bot may be further engageable to cause the group-based communication system to receive user settings on rendering of one or more external communication objects. As illustrated in FIG. 5E, in input fields 550, a user may be able to provide user input indicating whether to receive lower priority external communication objects and associated emails or only high priority external communication objects and associated emails, whether to receive user email message notification, and whether to show a consolidated unread message badge that represents one or more unread emails (and external communication objects associated).

The email bot may further include consolidated views of one or more external communication objects associated with the high priority "VIP emails" 520, one or more moderate priority "priority emails" 522 which are representative of one or more moderate priority external communication objects, and one or more low priority "other emails" 552 which are representative of one or more low priority external communication objects. A user may be able to engage with the email bot 510 by instructing a client device to send one or more messages and/or commands to the group-based communication system by typing in the input field 524.

Figure 5F:
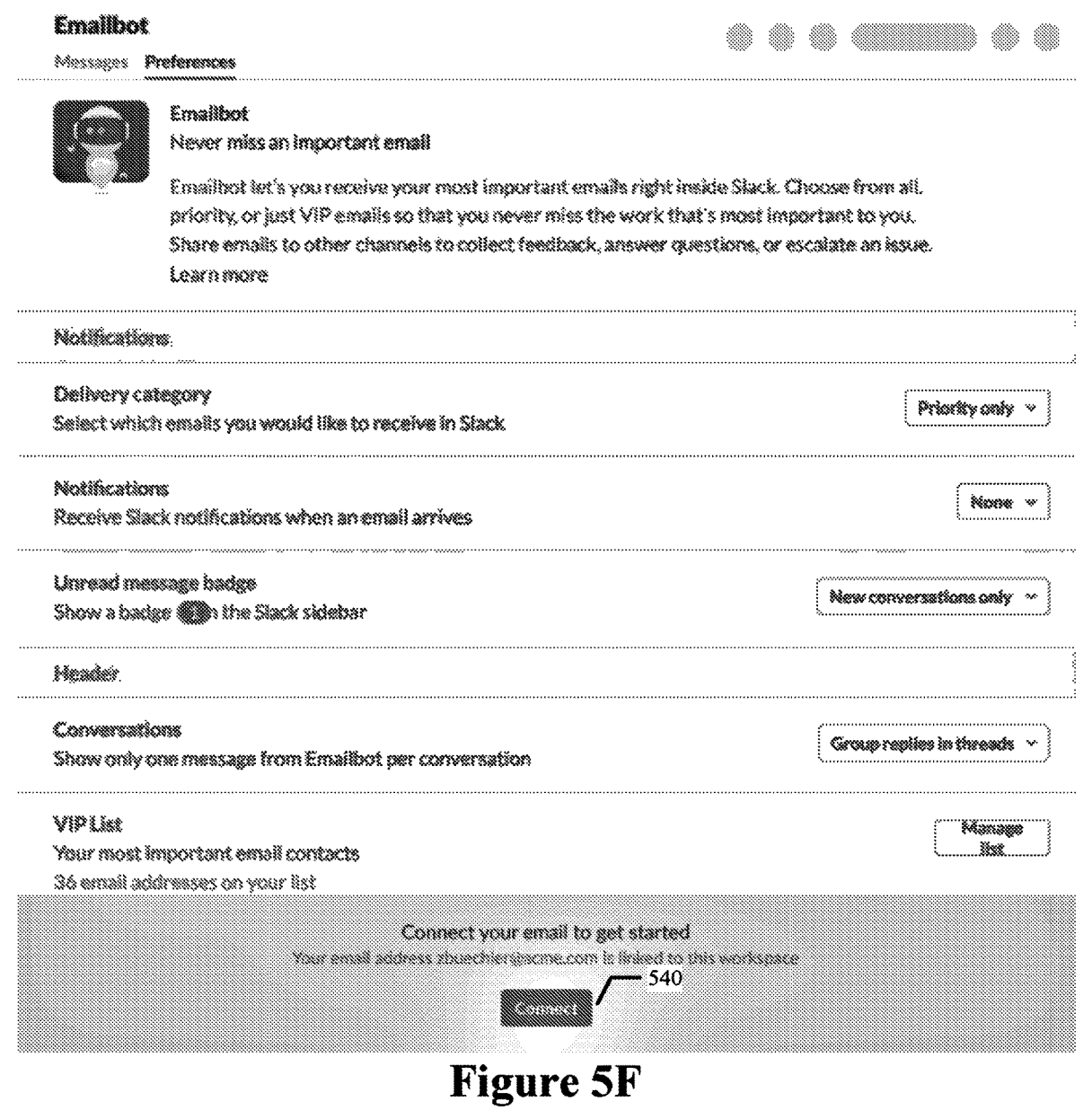

As illustrated in FIG. 5F, the user email message interface may take the form of an email bot that may be configured to receive user input indicating an association between another external email resource entity and a user profile associated with the user. The user may engage with the embedded "connect" button 540 to provide such user input.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, FIGS. 3 and 4 illustrate flowcharts of apparatuses and methods according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for programmatically managing email data integration between an external email resource and a group-based communication system comprising:
    associating the external email resource with an email address, a first group-based communication system user, and a first group-based communication system user identifier;
    receiving an external communication object from the external email resource;
    parsing the external communication object to identify external communication contextual data;
    querying a group-based communication system data corpus to identify prioritization data, the group-based communication system data corpus comprising group-based communication messaging data, group-based communication channel data, and group-based communication work object data;
    applying a graph-based knowledge representation data structure to the group-based communication system data corpus to analyze a strength of a user's association with the prioritization data, wherein the graph-based knowledge representation data structure indicates the user's associations to respective individual group-based communication channels of a plurality of group-based communication channels, the associations included in a channel work graph, and wherein the graph-based knowledge representation data structure determines the user's associations to each of a plurality of topics to create a topic work graph;
    generating a prioritization weight estimate for the prioritization data based on the graph-based knowledge representation data structure, wherein the prioritization weight estimate comprises a plurality of group-based communication channel-related weights corresponding to the associations included in the channel work graph, and wherein the prioritization weight estimate comprises a plurality of topic-related weights corresponding to the topic work graph determined from the group-based communication system data corpus;
    determining a prioritization score for the external communication object based on the prioritization weight estimate;
    transmitting the external communication object to a client device associated with the first group-based communication system user identifier when the prioritization score exceeds a prioritization score threshold; and
    rendering the external communication object for display in a first user email message interface within a group-based communication system interface to allow the first group-based communication system user to view the external communication object within the group-based communication system.

2. The method of claim 1, further comprising:
    allowing the first group-based communication system user to access the plurality of group-based communication channels via the group-based communication system interface.

3. The method of claim 1, further comprising:
    allowing the first group-based communication system user to selectively join at least one of the plurality of group-based communication channels.

4. The method of claim 1, further comprising:
    determining the prioritization score for the external communication object further based on the external communication contextual data.

5. The method of claim 1, wherein the graph-based knowledge representation data structure determines the user's associations to each of a plurality users to create a user work graph, and wherein the prioritization weight estimate comprises a plurality of user-related weights corresponding to the user work graph determined from the group-based communication system data corpus.

6. An apparatus for programmatically managing email data integration between an external email resource and a group-based communication system comprising at least one processor, and at least one memory having computer-executable instructions thereon, said computer-executable instructions configured to, when executed by the at least one processor, cause the apparatus to:
- associate the external email resource with an email address, a first group-based communication system user, and a first group-based communication system user identifier;
- receive an external communication object from the external email resource;
- parse the external communication object to identify external communication contextual data;
- query a group-based communication system data corpus to identify prioritization data, the group-based communication system data corpus comprising group-based communication messaging data, group-based communication channel data, and group-based communication work object data;
- apply a graph-based knowledge representation data structure to the group-based communication system data corpus to analyze a strength of a user's association with the prioritization data, wherein the graph-based knowledge representation data structure indicates the user's associations to respective individual group-based communication channels of a plurality of group-based communication channels, the associations included in a channel work graph, and wherein the graph-based knowledge representation data structure determines the user's associations to each of a plurality of topics to create a topic work graph;
- generate a prioritization weight estimate for the prioritization data based on the graph-based knowledge representation data structure, wherein the prioritization weight estimate comprises a plurality of group-based communication channel-related weights corresponding to the associations included in the channel work graph, and wherein the prioritization weight estimate comprises a plurality of topic-related weights corresponding to the topic work graph determined from the group-based communication system data corpus;
- determine a prioritization score for the external communication object based on the prioritization weight estimate;
- transmit the external communication object to a client device associated with the first group-based communication system user identifier when the prioritization score exceeds a prioritization score threshold; and
- render the external communication object for display in a first user email message interface within a group-based communication system interface to allow the first group-based communication system user to view the external communication object within the group-based communication system.

7. The apparatus of claim 6, further configured to:
allow the first group-based communication system user to access the plurality of group-based communication channels via the group-based communication system interface.

8. The apparatus of claim 6, further configured to:
allow the first group-based communication system user to selectively join at least one of the plurality of group-based communication channels.

9. The apparatus of claim 6, further configured to:
determine the prioritization score for the external communication object further based on the external communication contextual data.

10. The apparatus of claim 6, wherein the graph-based knowledge representation data structure determines the user's associations to each of a plurality users to create a user work graph, and wherein the prioritization weight estimate comprises a plurality of user-related weights corresponding to the user work graph determined from the group-based communication system data corpus.

11. A non-transitory computer-readable media storing computer-executable instructions, that when executed by a processor perform a method for programmatically managing email data integration between an external email resource and a group-based communication system, said method comprising:
- associating the external email resource with an email address, a first group-based communication system user, and a first group-based communication system user identifier;
- receiving an external communication object from the external email resource;
- parsing the external communication object to identify external communication contextual data;
- querying a group-based communication system data corpus to identify prioritization data, the group-based communication system data corpus comprising group-based communication messaging data, group-based communication channel data, and group-based communication work object data;
- applying a graph-based knowledge representation data structure to the group-based communication system data corpus to analyze a strength of a user's association with the prioritization data, wherein the graph-based knowledge representation data structure indicates the user's associations to respective individual group-based communication channels of a plurality of group-based communication channels, the associations included in a channel work graph, and wherein the graph-based knowledge representation data structure determines the user's associations to each of a plurality of topics to create a topic work graph;
- generating a prioritization weight estimate for the prioritization data based on the graph-based knowledge representation data structure, wherein the prioritization weight estimate comprises a plurality of group-based communication channel-related weights corresponding to the associations included in the channel work graph, and wherein the prioritization weight estimate comprises a plurality of topic-related weights corresponding to the topic work graph determined from the group-based communication system data corpus;
- determining a prioritization score for the external communication object based on the prioritization weight estimate;
- transmitting the external communication object to a client device associated with the first group-based communication system user identifier when the prioritization score exceeds a prioritization score threshold; and
- rendering the external communication object for display in a first user email message interface within a group-based communication system interface to allow the first group-based communication system user to view the external communication object within the group-based communication system.

12. The non-transitory computer-readable media of claim 11, the method further comprising:
allowing the first group-based communication system user to access the plurality of group-based communication channels via the group-based communication system interface.

13. The non-transitory computer-readable media of claim 11, the method further comprising:
    allowing the first group-based communication system user to selectively join at least one of the plurality of group-based communication channels.

14. The non-transitory computer-readable media of claim 11, the method further comprising:
    determining the prioritization score for the external communication object further based on the external communication contextual data.

* * * * *